Patented Feb. 14, 1933

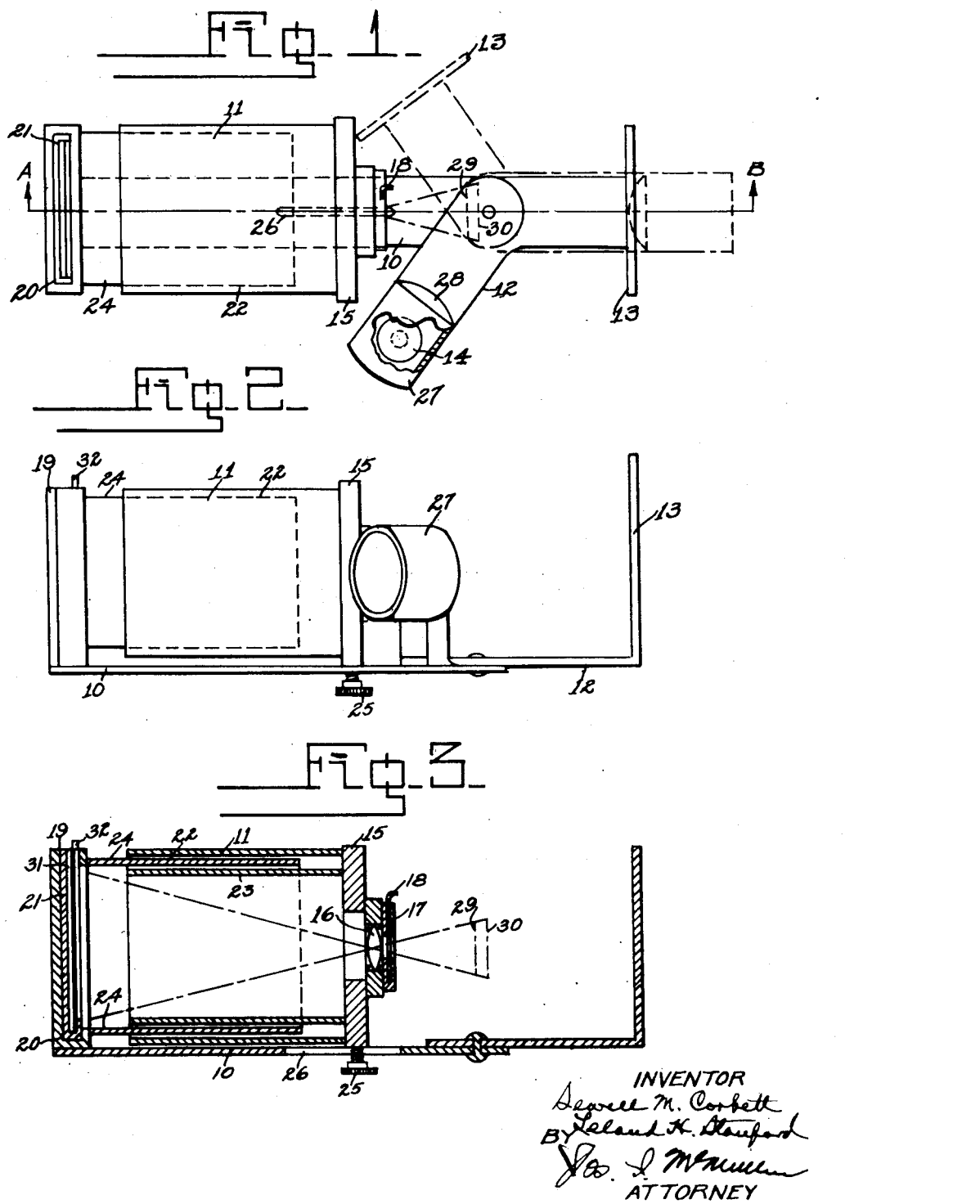

1,897,111

UNITED STATES PATENT OFFICE

SEWELL M. CORBETT, OF THE UNITED STATES ARMY, AND LELAND H. STANFORD, OF THE UNITED STATES ARMY, OF FORT SAM HOUSTON, TEXAS

PHOTOGRAPHIC DUST COUNT APPARATUS

Application filed December 12, 1930. Serial No. 501,861.

(GRANTED UNDER THE ACT OF MARCH 3, 1883, AS AMENDED APRIL 30, 1928; 370 O. G. 757)

This invention described herein may be manufactured and used by or for the Government for governmental purposes, without the payment to us of any royalty thereon.

This invention relates to a photographic means for determining the relative density of dust or similar foreign matter in air or gas.

The object of the invention is to provide a device whereby a photographic record of the free dust in a volume of air or gas, limited by the field of view of the camera and the depth of field of the lens, may be obtained and an accurate count of the dust content of the air or gas photographed, be made.

Another object is to photograph the dust in free air within the scope of the camera without introducing artificial conditions, and to enable all dust, including moving dust particles, to be counted.

Still another object is to provide a permanent and accurate record of the relative dust density and then enable the accuracy of the count to be verified.

A further object is to provide an apparatus in which any desired magnification of the dust particles may be made to enable the operator to obtain a clear photograph and one in which the minutest particles will be made visible.

Yet another object is to provide a device whereby a record of the dust density in various localities may be made in rapid succession and the results may 1 , averaged and determined at leisure.

Other objects reside in the simplicity, accuracy, compactness, portability and economy of operation of the device.

The device in its simplest form consists in the combination of a camera, a screen, and a light source, so arranged that the screen may form a background of the photographic field and the light source is utilized to illuminate the object to be photographed. In this case dust particles are illuminated by the light source and are photographed by reflected light therefrom; or the screen may be turned out of the optic field of the camera and be replaced by the light source, in which case the photograph is taken against the light or with the dust particles between the light and the camera lens.

The camera is provided with a short focus lens permanently set to photograph a shallow field relatively close to the lens, the illuminant and screen forming integral parts of the entire apparatus, as is shown below in a detailed description of the same.

The lens may be provided with facilities for setting it at one of several predetermined positions to vary the degree of magnification of the object. The area of field and depth of field of each setting being determined for the purpose of computing, in conjunction with the dust count, the dust density.

The device is designed and constructed, as stated above, so as to enable the photographs to be made against a dark background with light source close to the camera, to reveal dust of considerable reflective power; or, against a background of the illuminant to reveal opaque dust. The relative reflectibility or opacity respectively, as the case may be, will be evident on the photographic plate by the relative density of the image. The area of the sensitized surface and the focal length and depth of field of the lens may be designed and chosen so that the photographic images of dust in a unit volume are obtained, and the count of the images therefore will give a direct reading of the dust density.

Referring more particularly to the drawing in which corresponding parts are indicated by similar reference characters:

Fig. 1 is a top plan view of the apparatus illustrating in dotted and solid lines several positions for the illuminant and screen;

Fig. 2 is a side elevation of the apparatus; and

Fig. 3 is a side elevation in section taken along the line A—B in Fig. 1.

With particular reference to the drawing the numeral (10) represents a base on which is mounted the camera (11), and to which is pivotally attached the angle member (12) which forms a mounting for a screen (13) and a light source (14).

The camera (11) is composed of longitudinally movable front member (15) containing a lens (16) and shutter (17) operated through a lever (18) and a rigid rear member (19) provided with the customary compartment (20) for accommodating a holder (21), having slide (32), such as are ordinarily used for containing sensitized plates, or a film pack; or, if desired, the rear portion of the camera may be so constructed as to accommodate a film roll. To the front member (15) and rear member (19) are attached the longitudinal concentric sleeves (22), (23) and (24) respectively. These sleeves are so proportioned and mounted that the sleeve (24) is slidably movable between the sleeves (22) and (23) as shown, thus forming in conjunction with the front slidable member (15) and rear member (19), a light proof compartment of variable length between the lens (16) and the plate holder (21), and thereby providing the camera with focusing means. The front focusing member (15) may be clamped at any suitable distance from the sensitized plate by the set screw (25), which fits through a longitudinal slot (26) in the base (10) and screws into the slidable front member (15).

On the forward end of the base (10) is pivotally mounted the angle member (12) which supports at the outward extremity of its arms a blackened or otherwise suitably colored screen (13) and a lamp housing (27) respectively. The lamp housing has arranged therein a condensing lens (28) and a light source (24), preferably an electric incandescent filament light. The lens (28) is so arranged as to condense the rays of the illuminant to include the field of view of the camera lens (16).

In the position shown in solid lines on Fig. 1, when the light is turned on and the shutter operated, the dust within the space, bounded by the planes (29) and (30) and within the angle of view of the camera, is in focus on the sensitized plate (31) and on removal of the slide (32) and opening of the shutter (17) may be photographed by reflected light against the black background of screen (13) and will thus appear on the negative as black dots against a clear field.

By placing the angle arm (12) in position as indicated by the broken and dotted lines in Fig. 1, so that the rays from the illuminant are directed toward the camera, the opaque dust particles in the above described space will be photographed on the finished plate or film negative as clear dots on the black background when the light is turned on, the slide lifted and the shutter operated.

The instrument may be operated in either manner as indicated according to the desire of the operator. From the finished plate or negative the dust count can be made, and by multiplying the count by the ratio of the photograph volume to a unit volume, the dust count per unit volume can be computed. When several dust photographs are made in the same or nearby locations the aggregate count when multiplied by the ratio of the aggregate photograph volume to a unit volume will give a more accurate dust count per unit volume.

Throughout the above description the word dust has been used to include all particles of foreign matter and the word air is not used in a strict sense, but may also include any gas or fluid in which it is desired to obtain the relative density of foreign matter.

Although in the foregoing certain elements have been described as best adapted to perform the functions allotted to them, nevertheless it is to be understood that various minor changes may be resorted to within the scope of the appended claims without departing from or sacrificing any of the principles of this invention.

Having described our invention, what we claim as new and wish to secure by Letters Patent is:

1. A device for making a photographic record of the relative density of foreign matter suspended in air, comprising in combination a base, composed of a stationary and an angular member, said angular member having radially extending arms and a central portion at the intersection of its arms which is pivotally mounted on the stationary member; a camera mounted on said stationary member, an opaque darkened screen and an illuminating source mounted on either end of the arms of said angular member, said angular member being adaptable to such adjustment that when the screen is moved into the photographic field of said camera the rays of the illuminating source will be directed on a surface of said screen substantially as shown.

2. In a device for making a photographic record of the relative density of foreign matter suspended in air comprising in combination a base composed of a stationary and an angular movable member having two arms, pivotally mounted at the intersection of said arms to the stationary member; a camera mounted on said stationary member, a screen and an illuminating source mounted respectively at the extremities of each arm of the angular member and so arranged that when the screen is adjusted at right angles to the optical axis of the camera lens, the rays of the illuminant will be directed on a surface of the screen so that a photographic record may be made of the aforesaid suspended matter by the reflection of the rays of the illuminating source, substantially as shown.

3. A device for making a photographic record of the relative density of foreign matter suspended in air, comprising in combination a base composed of a stationary and an angular movable member having two arms pivotally mounted at the intersection of its arms to the stationary member; a camera mounted on said stationary member, a screen and an illuminating source mounted respectively at the outward extremities of each arm of the angular member and so arranged that when the screen is adjusted at right angles to the optical axis of the camera lens, the rays of the illuminant will be directed toward a surface of said screen, and when the illuminant is so adjusted that it lies on the optical center, its rays will be directed towards the camera lens and the screen will be moved out of the optical field of said lens, substantially as shown.

4. A device for making a photographic record of the relative density of foreign matter suspended in air comprising in combination a base, a camera having a short focus lens, a screen located in front of said camera and at right angles to the optical axis of said lens, and an illuminating source consisting of a lamp house having a condensing lens and containing an illuminant therein mounted on said base and capable of adjustment so that the rays of said illuminant will be directed on said screen, substantially as shown.

5. In a device for making a photographic record of the relative density of foreign particles suspended in air, the combination of a camera arranged to magnify and photograph said particles, a suitably colored screen forming a background against which said particles may be photographed, and an illuminating source so located with respect to said screen that its rays will be directed thereon to illuminate said particles while being photographed.

6. A device for making a photographic record of the relative density of foreign matter suspended in air, comprising in combination a base, composed of a stationary and an angular member, said angular member having radially extending arms and a central portion at the intersection of its arms which is pivotally mounted on the stationary member; a camera mounted on said stationary member, an opaque darkened screen and an illuminating source mounted on either end of the arms of said angular member, said angular member being adaptable to such adjustment that when the rays of the illuminating source are directed on the surface of the camera lens the screen will lie outside the photographic field.

7. In a device for making a photographic record of the relative density of foreign matter suspended in air comprising in combination a base composed of a stationary and an angular movable member having two arms pivotally mounted, at the intersection thereof, to the stationary member, a camera mounted on said stationary member, a screen and an illuminating source mounted respectively at the extremities of each arm of the angular member and so arranged that when the illuminating source is positioned on the optical axis with its rays directed toward the camera lens, the screen will be located out of the optical field of said camera, so that a photographic record may be made of the aforesaid suspended matter by their occlusion of the rays of the illuminating source, substantially as shown.

8. A device for making a photographic record of the relative density of foreign matter suspended in air comprising in combination a camera support, a camera mounted on the support, a source of illumination, and a background, the source of illumination and the background adjustably associated with the support for relative movement with respect to each other and to the photographic field of the camera.

9. A device for making a photographic record of the relative density of foreign matter suspended in air comprising in combination a base, consisting of a stationary member and a movable member pivotally mounted thereon; a camera supported on said stationary member, a screen mounted within the photographic field of said camera and forming a background, and an illuminating source mounted on said movable member with its rays directed diagonally with respect to the photographic field of said camera.

10. A device for making a photographic record of the relative density of foreign matter suspended in air comprising in combination a base, consisting of a stationary member and an angular member pivotally mounted on said stationary member, a camera arranged to magnify and photograph objects located in a photographic field supported on the stationary member; an opaque screen forming a background mounted within the photographic field of said camera and an illuminating source supported on the pivotally mounted angular member with its rays directed diagonally with respect to the photographic field of said camera to illuminate said objects.

SEWELL M. CORBETT.
LELAND H. STANFORD.